United States Patent Office 3,012,906
Patented Dec. 12, 1961

3,012,906
METALLIZED PLASTICS AND METHODS FOR MAKING SAME
Harry D. Anspon, Paducah, Ky., assignor to General Aniline & Film Corporation, New York, N.Y., a corporation of Delaware
No Drawing. Filed Aug. 15, 1958, Ser. No. 755,136
19 Claims. (Cl. 117—107)

This invention relates to metallized plastic materials and to methods for making same, and in particular to metallized α-chloroacrylic acid ester polymers and copolymers containing at least about 25% chloracrylate content, and to methods for making such metallized products.

Numerous methods have been suggested for the preparation of metallized plastic materials. Such methods include the deposition of the metal in a cathode sputtering process or by vapor deposition technique. Other methods are similar to the usual mirror ring techniques used in the preparation of glass mirrors. Employing the latter type techniques, that of the usual aqueous bath from which the metal is deposited, requires, in most instances with the plastics heretofore used, special ingredients in the bath, special pre-treatments of the plastic, and/or combinations of these. The vapor deposition method or the cathode sputtering technique has not proven successful with plastic bodies in general, due especially to the poor adherence of the metal coatings to the plastic surface. It has been discovered that outstanding, extremely adherent coatings of metals can be obtained on plastic surfaces where the plastic is a polymeric substance containing at least about 25% of an α-chloroacrylic acid ester. Adherence of the metal coatings to the homo polymer of such compounds is so pronounced that it is virtually impossible to remove it except by the use of strong abrasives and the like.

It is therefore an object of this invention to provide methods for the preparation of metallized plastic materials containing α-chloroacrylic acid ester polymers.

It is another object of this invention to provide methods for the preparation of metallized coatings on plastics containing at least about 25% of an α-chloroacrylic acid ester polymer.

It is still another object of this invention to provide metallized products containing α-chloroacrylic acid ester polymers.

It is a still further object of this invention to provide metallized products containing at least about 25% of an α-chloroacrylic acid ester polymer.

Other objects will appear hereinafter as the description proceeds.

It is well known that coatings of metal on such plastic surfaces as polymethyl methacrylate, polyethylene, polystyrene and the like are characterized by very poor adhesion to the surface of the plastic material. This poor adherence manifests itself regardless of the particular method employed for coating the plasticizable face. Thus, whether a plating bath is employed, or whether a vacuum deposition technique is used, the metal exhibits poor adhesion to the plastic surface. In spite of the numerous attempts to overcome such deficiencies by the employment of additives in the baths or by various manipulatory treatments applied to the plastic either during or after the coating, little success has been encountered in providing such metal coatings on these plastics. It is completely unexpected, therefore, that by employing the usual coating technique heretofore so unsuccessful with the other polymeric materials, outstanding and adherent metal coatings would be obtainable on polymeric materials containing α-chloroacrylic acid ester polymers. The presence of this polymeric material in the product to be coated may be as a homo polymer or copolymer. Either of these may be admixed with other plastic and/or polymeric materials to yield a product which results in tenaceous bonding of the applied metal coatings. In order to achieve the optimum in coating quality and particularly in adherence, the α-chloroacrylic acid ester content should be at least 25% by weight of the total based on the weight of the total base material to be coated. This minimum 25% content is independent of the source of the α-chloroacrylic acid ester, whether it be derived from a mixture of polymers, a mixture of copolymers, or a mixture of polymers and copolymers.

The metals which may be deposited and/or coated on the base materials herein contemplated include all of the known metals heretofore employed as coating materials. When using cathode sputtering techniques or vapor deposition methods, such metals as aluminum, copper, nickel, silver, tungsten, platinum, gold and the like may be employed. The deposition of these metals, among numerous other metals, onto glass surfaces is well known as are the various techniques for applying the coatings by cathode sputtering or vapor deposition. Any of the metal depositing baths which have heretofore been used for coating non-metallic surfaces such as glass and the like may be used in the present invention. The most common of such baths is the alkaline-silver bath whereby silver mirrors, among other products, are produced.

The α-chloroacrylic acid esters which are contemplated for use in the present invention include the alkyl, alkenyl, aryl, cycloalkyl, aralkyl, and heterocyclic esters. The following esters exemplify these groupings:

Methyl α-chloroacrylate
Ethyl α-chloroacrylate
Propyl α-chloroacrylate
Isopropyl α-chloroacrylate
Butyl α-chloroacrylate
Amyl α-chloroacrylate
Isoamyl α-chloroacrylate
Hexyl α-chloroacrylate
Octyl α-chloroacrylate
Lauryl α-chloroacrylate
Allyl α-chloroacrylate
Methallyl α-chloroacrylate
Crotyl α-chloroacrylate
Cyclohexyl α-chloroacrylate
Methyl cyclohexyl α-chloroacrylate
Benzyl α-chloroacrylate
Phenyl α-chloroacrylate
Tolyl α-chloroacrylate
Tetrahydrofurfuryl α-chloroacrylate, and the like.

In addition to the alkyl esters derived from the monohydric alcohols, esters prepared from polyhydric alcohols are also suitable. Such esters include the ethylene glycol esters, 1,4-butanediol esters, 1,6-hexanediol esters, and the like. The aforementioned esters may be admixed with other polymeric materials such as polystyrene, polymethyl methacrylate, polyvinyl esters, polyvinyl ethers, and the like. Copolymers of the above described chloroacrylate esters with other polymerizable ethylenically saturated monomers may also be employed as base materials. These monomers include methacrylic acid esters, acrylic acid esters, for example, methyl acrylate and ethyl acrylate, acrylonitrile, vinyl alcohol esters such as vinyl acetate, vinyl chloride and vinyl benzoate, esters of unsaturated polycarboxylic acids such as dimethyl maleate, diethyl maleate, and diaryl maleate, and ethers such as divinyl ether, diallyl ether, and vinyl allyl ether. In addition to the copolymers and mixtures of copolymers with chloracrylates and mixtures of chloracrylates with other polymers, it is of course understood that mixtures and interpolymers of the above described chloracrylate esters may be used.

The following examples will serve to illustrate the present invention without being deemed limitative thereof.

*Example 1*

A sheet of polymethyl α-chloracrylate having optically smooth surfaces is placed in a chamber and the latter evacuated to a high vacuum of 0.01 mm. pressure of mercury. Cathodes of silver using an applied voltage of 25,000 volts between the cathode and anode resulted in a metallic discharge of silver from the cathode and consequent transference to the plastic surface. The resultant metallized polymer exhibited all of the characteristics of an outstanding silvered mirror. The silver coating could not be removed by chipping, flaking or rubbing off.

*Example 2*

The procedure of Example 1 is repeated employing aluminum as the cathode metal. An outstanding adherent coating of specularly reflecting metal is obtained on the polymer sheet.

*Example 3*

The procedure of Example 1 is again repeated employing chromium as the metal cathode. Similar results are obtained.

*Example 4*

A sheet of methyl α-chloroacrylate polymer having optically smooth surfaces is immersed in a chemical silvering bath having the following composition:

(1) 5 g. of silver nitrate dissolved in 300 ml. of distilled water to which dilute ammonium hydroxide has been added until the precipitate is dissolved but not entirely so. Water is added to make 500 mls. of solution.

(2) 1 g. of silver nitrate and 0.83 g. Rochelle salts and sufficient water to make 500 mls. of solution.

Solutions 1 and 2 above are mixed together and the polymer sheet immersed therein. After 20 min. the sheet is removed, rinsed with water and carefully wiped off with absorbent cotton. A further rinse with alcohol to facilitate drying is made. After drying, the silvered surface is polished with a pad of chamois on which a little rouge is placed. An excellent and adherent coating of silver results on the polymer sheet. This example illustrates the Rochelle salts process for the chemical silvering of the subject polymer. One may also employ any other comparable chemical silvering technique such as the Brashear process.

*Example 5*

Examples 1 through 4 are repeated employing a polymer sheet of ethyl α-chloroacrylate. Similar results are obtained.

*Example 6*

Examples 1 and 4 are repeated employing the following polymer sheets:

Allyl α-chloroacrylate
Cyclohexyl α-chloroacrylate
Phenyl α-chloroacrylate
Tetrahydrofurfuryl α-chloroacrylate The results are comparable to those obtained in the above examples.

*Example 7*

Examples 1 and 4 are again repeated employing sheets of the following composition:

a. Copolymer of 50% methyl α-chloroacrylate and 50% methyl acrylate.
b. Copolymer of 25% methyl α-chloroacrylate and 75% acrylonitrile.
c. Copolymer containing 90% methyl α-chloroacrylate and 10% dimethyl maleate.
d. A mixture of 50% polymethyl α-chloroacrylate and 50% polystyrene.
e. A mixture of 25% polymethyl α-chloroacrylate and 75% polymethylmethacrylate.

In each instance, outstanding and firmly adherent coatings are obtained.

In addition to polymer sheets, copolymer products and mixtures thereof composed wholly of the α-chloroacrylic acid esters and the α-chloroacrylic acid ester containing polymers, it is also possible to obtain firmly adherent metal coatings on products which have a layer or surface or coating of the α-chloroacrylic acid ester containing product. Thus, it is possible to metallize laminated structure wherein one of the lamina contains an α-chloroacrylic acid ester as contemplated within the present invention. It is also within the purview of this invention to apply metal coatings to products which have been coated with α-chloroacrylic acid ester containing products. These polymer coatings may be applied to any suitable surface such as wood, metal, glass, and other synthetic resin products.

Other variations in and modifications of the described processes which will be obvious to those skilled in the art can be made in this invention without departing from the scope or spirit thereof.

I claim:
1. An article of manufacture comprising a base having a surface of at least 25% of an α-chloroacrylic acid ester polymer and an adherent metal coating on said polymer surface.
2. An article of manufacture comprising a polymer containing at least 25% of an α-chloroacrylic acid ester and an adherent metal coating thereon.
3. An article of manufacture comprising a methyl α-chloroacrylate polymer having a metal coating thereon.
4. An article of manufacture comprising a polymer of methyl α-chloroacrylate having a silver coating thereon.
5. An article of manufacture comprising a base containing at least 25% methyl α-chloroacrylate polymer and a metallic coating on said base.
6. An article of manufacture comprising a base having a surface containing at least 25% methyl α-chloroacrylate polymer and a metallic coating thereon.
7. An article of manufacture as defined in claim 6 wherein the metal coating is silver.
8. An article of manufacture as defined in claim 6 wherein said metal coating is aluminum.
9. An article of manufacture as defined in claim 6 wherein said metal coating is chromium.
10. An article of manufacture comprising polymethyl α-chloroacrylate having a silver coating integrally bonded thereto.
11. A method for the manufacture of metal surfaced plastics which comprises applying a metallic coating to a base containing at least about 25% of an α-chloroacrylic acid ester polymer.
12. A method as defined in claim 11 wherein the metal coating is deposited from the vapors thereof.
13. A method as defined in claim 11 wherein the metal coating is produced in a chemical metallizing bath.
14. A method as defined in claim 11 wherein the base comprises a surface of at least 25% of an α-chloroacrylic acid ester.

15. A method as defined in claim 11 wherein the base comprises polymethyl α-chloroacrylate.

16. A method as defined in claim 15 wherein the metal coating is a silver coating.

17. A method as defined in claim 15 wherein the metal coating is an aluminum coating.

18. A method as defined in claim 15 wherein the metal coating is a chromium coating.

19. A method as defined in claim 15 wherein the metal coating is silver deposited from a chemical silvering bath.

References Cited in the file of this patent

UNITED STATES PATENTS

| | | |
|---|---|---|
| 2,273,613 | Bartoe | Feb. 17, 1942 |
| 2,387,970 | Alexander | Oct. 30, 1945 |
| 2,413,606 | Colbert et al. | Dec. 31, 1946 |
| 2,548,091 | Barnes et al. | Apr. 10, 1951 |
| 2,602,757 | Kantrowitz et al. | July 8, 1952 |
| 2,665,224 | Clough et al. | Jan. 5, 1954 |
| 2,689,805 | Croze et al. | Sept. 21, 1954 |